United States Patent
Mies

(10) Patent No.: US 7,127,824 B2
(45) Date of Patent: Oct. 31, 2006

(54) APPARATUS FOR DETECTING THE POSITION IN SPACE OF A CARRIAGE MOVEABLE ALONG A COORDINATE AXIS

(75) Inventor: Georg Mies, Wipperfuerth (DE)

(73) Assignee: Klingelnberg GmbH, Hueckeswagen (DE)

( * ) Notice: Subject to any disclaimer, the term of this patent is extended or adjusted under 35 U.S.C. 154(b) by 373 days.

(21) Appl. No.: 10/802,208

(22) Filed: Mar. 17, 2004

(65) Prior Publication Data

US 2004/0246499 A1   Dec. 9, 2004

(30) Foreign Application Priority Data

Mar. 24, 2003  (DE) ................ 103 13 036

(51) Int. Cl.
  *G01B 5/004*  (2006.01)
  *G01B 11/14* (2006.01)
  *G01D 5/347* (2006.01)

(52) U.S. Cl. .................. 33/503; 33/706; 33/1 M; 33/556; 356/616

(58) Field of Classification Search .......... 33/503, 33/1 M, 556, 558, 706, 707, 708; 356/614, 356/616

See application file for complete search history.

(56) References Cited

U.S. PATENT DOCUMENTS

| | | | | |
|---|---|---|---|---|
| 4,166,323 A | * | 9/1979 | Maag ................ | 33/501.9 |
| 4,587,622 A | * | 5/1986 | Herzog ............... | 702/97 |
| 4,833,630 A | * | 5/1989 | Braman et al. ...... | 702/168 |
| 4,961,267 A | * | 10/1990 | Herzog ............... | 33/503 |
| 5,061,073 A | * | 10/1991 | Michel ............... | 356/619 |
| 5,456,020 A | * | 10/1995 | Kellner .............. | 33/707 |
| 5,727,326 A | * | 3/1998 | Mies et al. ......... | 33/501.9 |
| 6,082,010 A | * | 7/2000 | Lee .................. | 33/1 M |

(Continued)

FOREIGN PATENT DOCUMENTS

| | | |
|---|---|---|
| DE | 31 50 977 A1 | 6/1983 |
| DE | 43 08 456 C2 | 9/1994 |
| DE | 43 45 094 C2 | 7/1995 |
| GB | 2 034 880 A | 6/1980 |
| WO | WO 99/17073 | 4/1999 |

OTHER PUBLICATIONS

Klingelnberg, "Verzahnungsmesszentren Klingelnberg P 65/ P100", pp. 1-16.

*Primary Examiner*—Diego Gutierrez
*Assistant Examiner*—Amy R. Cohen
(74) *Attorney, Agent, or Firm*—McCormick, Paulding & Huber LLP

(57) ABSTRACT

Described is a device for machine tools or measuring apparatus for detecting the spatial position of a carriage movable in a coordinate axis along a guide with respect to a reference standard which is designed as a rectangular plate extending parallel to the guide of the carriage. Two opposed, parallel surfaces of the reference standard carry each a two-dimensional line grating. A position measuring system serves the function of determining continuously the spatial position of a support member fixedly connectible with the carriage. The position measuring system includes three optical incremental reading heads and one distance sensor. The support member is arranged on the movable carriage such as to prevent the support member from contacting the reference standard over the entire length of the travel while at the same time detection is being performed. Owing to the arrangement of the three reading heads and the distance sensor at accurately defined positions on the support member it is possible to determine the location and the spatial position of the support member and hence of the carriage connected therewith.

11 Claims, 2 Drawing Sheets

U.S. PATENT DOCUMENTS

| | | | |
|---|---|---|---|
| 6,351,313 B1 * | 2/2002 | Braasch et al. | 356/616 |
| 6,389,702 B1 * | 5/2002 | Dudley | 33/1 M |
| 6,543,149 B1 * | 4/2003 | Carlisle | 33/503 |
| 6,791,699 B1 * | 9/2004 | Aoki | 356/616 |
| 6,949,733 B1 * | 9/2005 | Widdowson et al. | 250/221 |
| 2004/0231177 A1 * | 11/2004 | Mies | 33/503 |

* cited by examiner

APPARATUS FOR DETECTING THE POSITION IN SPACE OF A CARRIAGE MOVEABLE ALONG A COORDINATE AXIS

CROSS-REFERENCE TO RELATED APPLICATIONS

This application is entitled to the benefit of and incorporates by reference essential subject matter disclosed in German Patent Application No. 10313036.5 filed on Mar. 24, 2003.

FIELD OF THE INVENTION

The invention relates to a device for machine tools or measuring apparatus for detecting a spatial position of a carriage movable in a coordinate axis along a guide with respect to a prismatic reference standard of preferably polygonal cross-section, which extends parallel to the guide of the carriage.

In this context, detection of a spatial position of the carriage means that it shall not only include the detection of the primary movement in the desired coordinate direction but also any other minor movements, caused by guide defects, in the direction of the total of six degrees of freedom of a rigid body in space.

BACKGROUND OF THE INVENTION

From DE 31 50 977 A1 methods and a device are known for determining and correcting guide defects of guided machine parts, the device corresponding to the device initially referred to. In a first method, relevant guide defects of a measuring machine are determined and approximated by correcting functions stored in the machine's computing unit. The incorrect results of the coordinate measuring device are then corrected in subsequent measurements by means of the correcting functions. In a second method, additional measuring devices are attached to the movable parts of the measuring machine to measure the distance to reference lines extending in the direction of displacement. With these measuring devices the guide defects are detected continuously during the measurement operation. The computing unit of the measuring machine uses the output signals of the additional measuring devices in order to correct the incorrect results of the coordinate measuring device. In a third method, the existing guide surfaces of the machine serve as reference lines, which is a less complex task, and the deviations once established by measurement against a linearity standard are stored in the form of an approximation function and used for permanent correction of the measurement values of the additional measuring devices. In this third method, which is a combination of the two methods first referred to, the tips of additional probes slide on the guide surfaces. To implement the two first-identified methods, use is made of a prismatic reference standard that extends parallel to the guide of a carriage. The reference standard carries on a first and on a second surface line gratings, one of which is two-dimensional. A position measuring system serves to determine the spatial position of a support member fixedly connected to the carriage, which support member has reading heads fitted to it and is guided on the reference standard. The reading heads or the support member are placed directly on surfaces of the reference standard. Such a measuring system which measures the displacement in a coordinate and detects at the same time the influence of any guide defects, is suitable, for example, for attachment to the guides of a measuring or processing machine with the aim to enhance its positioning accuracy considerably. In the first method it is assumed that the guide defects are constant and, once measured, can be stored as an approximation function to be considered in subsequent measurements. In the second method guide defects are measured continuously, yet only the relevant ones because of the increased complexity involved. The third method requires the use of an approximation function and the permanent correction of the measurement values of the additional measuring devices. In all the methods, the reference standard serves as a mechanical guide for the support member, which is always a disadvantage.

From DE 43 45 094 C2 a shape measuring machine is known, which includes a reference system for path correction on guideways that is decoupled from the machine's guiding means and control devices and comprises dimensionally accurate elongate standards disposed in parallel alignment to the individual coordinate axes of slidable carriages and adapted to be scanned continuously by parts movable on the guiding means. The reference system is not exposed to major forces and is constituted so as to have a geometry which is long-term stable with little sensitivity to temperature. While this known shape measuring machine distinguishes itself by displaying good guiding relationships for the slidable carriages, the complexity involved is considerable, in terms of both apparatus and measurement expenditure. The reference system is comprised of three standards, each formed by profiled rails of rectangular cross-section carrying scanning tracks on two adjacent lateral surfaces. The first standard is mounted on the machine bed. The second standard is attached to the end of a vertical column in addition to having at one end angle brackets embracing the scanning tracks of the first standard, so that the second standard is coupled to the first standard. Correspondingly, the third standard is coupled to the second standard. Provided at each of the two coupling locations between the three standards are several sensors which detect any relative movement between two standards at their coupling location in terms of their position and direction. The detected values are fed to a computing unit calculating therefrom corresponding correction values for the measurement result or for the spatial position of the probe element. This construction aims to enable the known shape measuring machine to exhibit an improved dynamic behavior and reduced non-productive times and durations of measurement as compared with a shape measuring machine with an extremely rigid machine bed, which is frequently manufactured from granite and supports, through a sliding carriage, the vertical column, which in turn is either a solid or heavy cast or steel welded construction.

From WO 99/17073 a device is known for the detection of six components of the relative motion of two bodies with one primarily two-dimensional translational basic motion. The bodies are formed of a plate provided with a two-dimensional optical grating and of an element having a plane surface parallel to the plate and including several optical gratings as reading head. The element is approximated to the plate in such fashion that the optical gratings enable detection of relative displacements, parallel to the plate, in the X and Y directions through evaluation of the intensity variations of the reflected light. To detect the distance between the element and the plate, provision is made for at least three distance sensing devices which are of the capacitive, inductive or probe type. To detect the spatial position of a carriage movable in a coordinate axis along a guide, that is, to detect a primarily one-dimensional movement, the known device is less suited because it is too complex for this purpose.

GB 2 034 880 A discloses an apparatus equally designed in particular to perform linear measurements in two dimensions. In addition, it provides a carriage movable along guide rails in two dimensions over a base. The carriage includes a surface upon which may be placed an object to be measured. The underside of the surface carries a first optical grating comprising parallel lines extending at right angles to one another. A probe is positioned above the surface. Secured to the base under the carriage are two reading heads for detecting movements of the carriage in two vertical directions. Due to its structural design this known apparatus is not suited either for the detection of the spatial position of a carriage movable in a coordinate axis along a guide of a machine tool or a measuring apparatus.

DE 43 08 456 C2 discloses a device which, for determining the position of a body to be positioned with respect to a prismatic reference body, detects the six degrees of freedom of the body to be positioned with respect to the reference body. The reference body carries on one of two surfaces disposed at right angles to one another two graduated scales, and on the other surface one graduated scale. The three graduated scales are designed as optical samplers in the form of CCD lines. The body to be positioned carries three projectors associated with the three graduated scales. Each projector emits three diverging light planes intersecting in a projection center, each light plane projecting three light marks onto the graduated scales. From the position of the individual light marks on the graduated scales it is possible to compute the spatial position of the projection centers longitudinally of the reference body and their distance to the corresponding surfaces of the reference body. These measurement values determine the position of the body to be positioned in its six degrees of freedom relative to the reference body.

It is an object of the present invention to improve a device of the type initially referred to so that defects of geometry in a linear axis of machine tools or measuring apparatus are without effect, which is accomplished by performing a continuous detection of a spatial position of the corresponding carriage directly, said device being desirably integrable into a machine or measuring apparatus construction.

SUMMARY OF THE INVENTION

This object is accomplished according to the present invention by a device for machine tools or measuring apparatus for detecting the spatial positions of a carriage movable in a coordinate axis along a guide with respect to a prismatic reference standard. Preferably, the reference standard has a polygonal cross-sectional which extends approximately parallel to the guide of the carriage. The reference standard includes line gratings at least on one first and one second surface, at least one of which is two dimensional. Provision is also made for a position measuring system for determining the spatial position of a support member fixedly connectible with or integrated into the carriage.

Preferably, the first and second surfaces of the reference standard include two-dimensional line gratings. For detecting the line gratings of the reference standard the position measuring system includes a first reading head, and spaced therefrom a second-head. The first and second reading heads are provided on the support member and associated with one of the two dimensional line gratings. A third reading head is also provided on the support member and is associated with a second of one of the two dimensional line gratings.

A distance sensor is provided for detecting the distance between the support member and one of the surfaces provided with a two dimensional line grating or any surface parallel thereto.

The support surface is arranged on the carriage so that the support member is prevented from contacting the reference standard during the detection operation.

In the device of the present invention, the first and the second surface of the reference standard carry two-dimensional line gratings detectable by the position measuring system, which for this purpose has three spaced reading heads and one distance sensor, with the arrangement of the support member on the movable carriage being such as to prevent the support member from contacting the reference standard over the entire length of the travel while at the same time detection is being performed. Owing to these features, the achievements of the position measuring system integrated into the device are the following, independently of the mechanical guiding quality of the carriage and the repeatability of the coordinate axis concerned: For example, when the carriage carries a measuring probe its position relative to the coordinate origin and hence relative to the object being measured can be determined accurately at any time, resulting in reduced measurement uncertainty of the measuring apparatus. When the carriage carries a tool which as a rule is at a major distance from the carriage, the desired position of the tool relative to the workpiece can be adjusted with greater accuracy. The reason for the more accurate adjustability is that even minimal variations in the movement of the carriage have an amplified effect on the tool. By integrating the device into a machine or measuring apparatus construction, static or dynamic geometry defects are considered in the measurement result. The positioning accuracy is further enhanced in particular by preventing the support member from contacting the reference standard. In contrast to the device known from WO 99/17073, the integrability of the device of the present invention into a machine tool or a measuring apparatus is achieved by eliminating the need for a planar standard and a plane surface parallel thereto, whose relative positions are detected by a three-dimensionally operating reading head and three distance sensors, providing instead, for determination of the spatial position of a support member fixedly connectable with or integrated into the carriage, three reading heads and one distance sensor, which detect two-dimensional line gratings on two surfaces of a reference standard and, respectively, the distance between the reference standard and the support member, which makes it possible to detect the spatial position of a carriage movable in the coordinate axis along a guide.

In the device of the present invention the reference standard does not serve as guide for the position measuring system, so that forces caused by contact, which may adversely affect the measurement result, are avoided. The reference standard is completely decoupled from the machine or the measuring apparatus in terms of forces, being hence maintained free from bearing and guiding loads. The measurement result obtained by the position measuring system thus reflects at all times the actual position of the support member with respect to the reference standard, regardless of whether or to which extent the guide of the carriage exhibits defects. Any path deviations of the carriage thus enter the measurement operation directly.

In the device of the present invention the reference standard carries on two surfaces graduations in the form of line gratings, similar to the prismatic reference body of the device of DE 43 08 456 C2, yet these line gratings are of two-dimensional design, with the associated reading heads supplying only length measurement values, and an additional distance sensor supplying a distance value. The values for the six degrees of freedom of the carriage or body to be positioned can then be computed from the length measurement values and the one distance value.

Advantageous configurations of the device of the present invention are the subject-matter of the subclaims.

If in one configuration of the device of the invention the first and the second surface are two opposed parallel lateral surfaces of the reference standard, the reference standard can be an elongate, ruler-type body of rectangular cross-section. The location and the spatial position of the support member and the carriage connected therewith with respect to the reference standard are thus detectable in particularly simple manner.

If in another configuration of the device of the invention the first and the second surface of the reference standard are, respectively, one lateral surface and one end surface arranged at an angle thereto, the support member can be of a construction which for particular applications may be more convenient than in the case of the preceding configuration of the device of the invention in which the line gratings are arranged on two opposed, parallel surfaces.

If in a further configuration of the device of the invention the distance sensor is provided on the support member in a defined position with respect to the reading heads, it is in a position to determine its distance to one of the surfaces carrying the line gratings in a direction at right angles to the coordinate axis. By virtue of the arrangement of the reading heads and the distance sensor in accurately defined positions on the support member, the location and the spatial position of the support member and the carriage connected therewith can be determined repeatably.

If in still further configurations of the device of the invention the reference standard and the support member are made of a temperature-invariant material, effects of temperature on the measuring accuracy of the position measuring system can be precluded.

If in a further configuration of the device of the invention the reference standard is configured for arrangement between two spaced longitudinal guideways forming the guide for the carriage, the reference standard is mountable on a mounting structure of the machine or measuring apparatus, which mounting structure is disposed longitudinally of the coordinate axis, in such manner that variations in the dimensions or the position of the column and hence of the guide of the carriage are also detected on account of the applied type of pick-up of measured values. Known measuring apparatus which would be suitable for use with at least this particular configuration of the device of the invention are the Klingelnberg P 65/P 100 gear measuring centers illustrated and described in the company's 2002 brochure No. 1353/D/IO so designated.

If in still another configuration of the device of the invention the reference standard is an elongate rectangular plate, the plate may be dimensioned so as to enable it to be arranged between spaced longitudinal guideways of the carriage, level therewith or in a forwardly offset relationship thereto.

If in yet another configuration of the device of the invention the support member is U-shaped in cross-section and carries on its two U legs the first and second and, respectively, third reading head, it is particularly suitable for attachment to the carriage in such manner that the reading heads are capable of detecting the two-dimensional line gratings on two opposed, parallel surfaces of the reference standard.

If in a further configuration of the device of the invention the support member is an angle bracket carrying on its two arms the first and second and, respectively, third reading head, the position measuring system is particularly suitable for the detection of line gratings which the reference standard carries on two surfaces arranged at an angle to one another.

If in still another configuration of the device of the invention the third reading head is provided on the support member in such manner that it lies opposite and level with the first or the second reading head with respect to the longitudinal dimension of the reference standard, the two reading heads are capable of detecting their position in the direction of the coordinate axis and in a direction at right angles thereto relative to opposite-mounted cross-ruled grating structures of the reference standard. The three reading heads are in a position to detect tilting of the support member about the coordinate axis and about two further coordinate axes at right angles to the coordinate axis.

BRIEF DESCRIPTION OF THE DRAWINGS

Embodiments of the present invention will be described in more detail in the following with reference to the accompanying drawings. In the drawings.

DETAILED DESCRIPTION OF THE PREFERRED EMBODIMENTS

Figure 1:
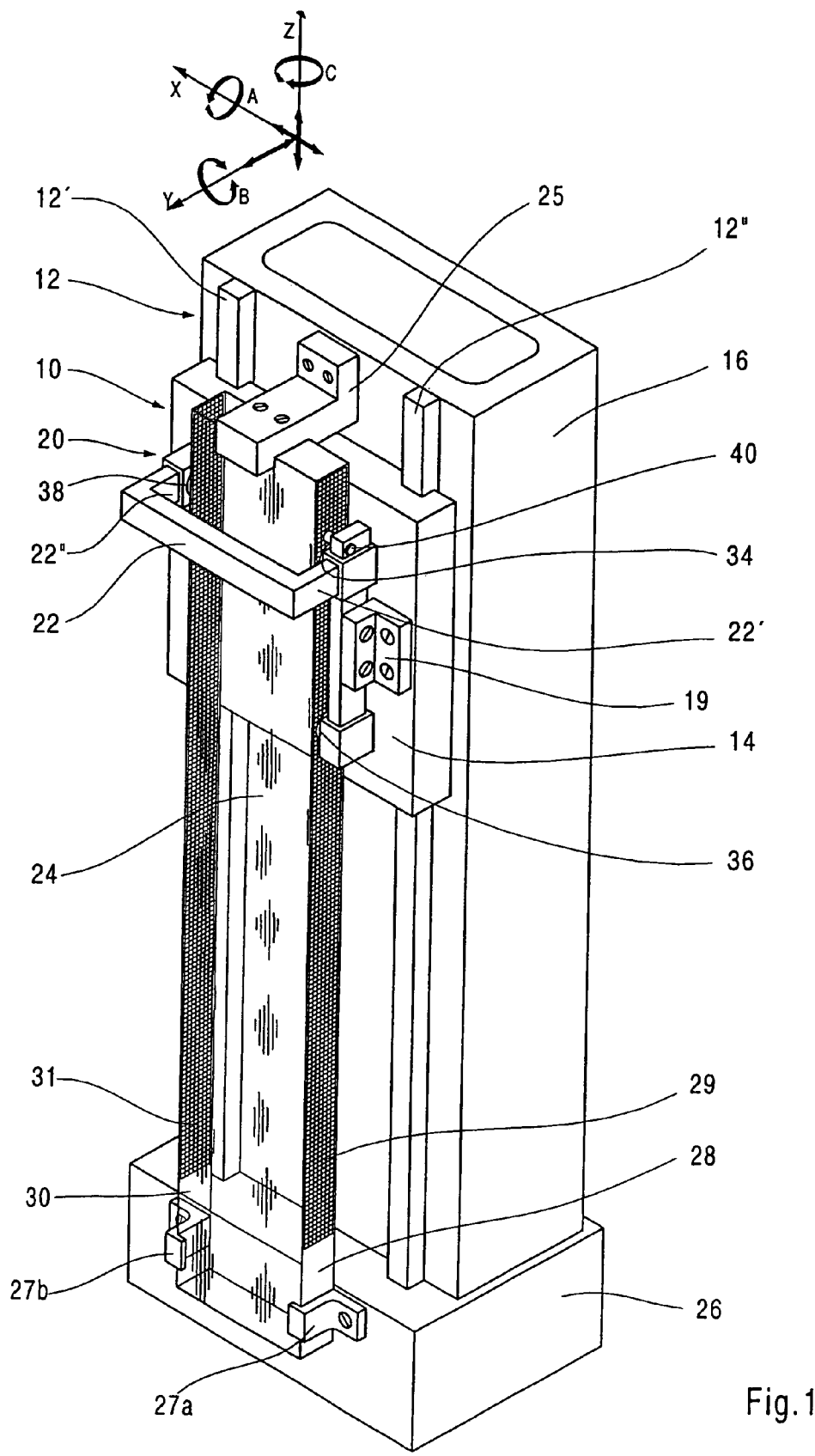
FIG. 1 is a view of a first embodiment of a device of the present invention, whose position measuring system includes a reference standard carrying two-dimensional line gratings on two opposed parallel surfaces.

FIG. 1 shows a device, generally designated as 10, for machine tools or measuring apparatus for detecting the spatial position of a carriage 14 movable in the direction of a coordinate axis along a guide generally designated as 12. In the embodiment shown, the coordinate axis is the Z axis of a right-angled XYZ coordinate system illustrated at the top of FIG. 1. This illustration shows six degrees of freedom of movement of a rigid body, that is, three translational degrees of freedom X, Y and Z and three rotary degrees of freedom A, B and C. The spatial position of a body is completely defined by the six degrees of freedom. The body whose spatial position is to be detected in the case herein described is the carriage 14. The carriage 14 has a distinct movement coordinate in Z direction. The aim is to detect the movement in Z direction inclusive of all components of movement in the direction of the six degrees of freedom. Of the machine tools or measuring apparatus for which the device 10 is intended only a Z column 16 is indicated schematically, which is a rigid, torsion-resistant, elongate hollow structure. The guide 12 of the carriage 14 is formed by two longitudinal guideways 12', 12" spaced from each other in a direction transverse to the Z axis. The carriage 14 has two parallel longitudinal grooves receiving the longitudinal guideways 12', 12" slidably therein, and it carries, for example, a three-dimensional probe assembly which is not shown for the sake of greater clarity of the illustration, as is a carriage disposed under the Z column 16 and operable to move the column, since these details are not necessary for an understanding of the invention. For the same reason, the drive system for the carriage 14 is equally not shown.

To detect the spatial position of the carriage 14 a position measuring system generally designated as 20 is used, with which the spatial position of a support member 22 fixedly connected to the carriage 14 by means of an angle bracket 19 relative to a prismatic reference standard 24 is determinable, said reference standard extending parallel to the guide 12 of the carriage 14 and being of a polygonal cross-section, in the embodiment shown of a rectangular cross-section. The reference standard 24 is arranged parallel to the Z axis and parallel to the carriage 14 at fixed distances to the Z column 16 and the carriage 14. In the embodiment shown, the reference standard 24 is an elongate rectangular plate having its upper part fixedly connected to the Z column 16 by means of an angle bracket 25, while its lower part is slidably connected to a baseplate 26 by two angle brackets 27a, 27b. The baseplate 26 is rigidly connected to the Z column 16. The reference standard 24 is made of a temperature-invariant material to prevent the possibility of temperature effects on the detection of the spatial position of the carriage 14. The baseplate 26 may also be made of a temperature-invariant material. The angle brackets 19, 25 and 27a, 27b herein defined as fixed and, respectively, movable connections are shown merely for purposes of illustration and in practice may be made of totally different, yet equivalent means.

The reference standard 24 carries on a first surface, herein a lateral surface 28, and on a second surface, herein a lateral surface 30, a two-dimensional line grating 29 and 31, respectively. Hence, the first and the second surfaces are the two opposed, parallel lateral surfaces on the longitudinal outer sides of the elongate rectangular plate constituting the reference standard 24.

To detect the line gratings 29, 31 of the reference standard 24, the position measuring system 20 comprises:

a first reading head 34 and, under it and vertically spaced therefrom, a second reading head 36, both of which are provided on the support member 22 and associated with the first line grating 29;

a third reading head 38 provided on the support member 22 and associated with the second line grating 31; and a distance sensor 40 for detecting the distance between the support member 22 and the lateral surface 28 provided with the first line grating 29 or any other surface of the reference standard 24 parallel thereto.

The support member 22 is arranged on the carriage 14 in such manner that neither the support member nor the reading heads 34, 36, 38 nor the distance sensor 40 are able to contact the reference standard 24 at any point. Preferably, the third reading head 38 is provided on the support member 22 so as to be opposite and level with the first reading head 34 with respect to the longitudinal dimension of the reference standard 24. The second reading head 36 is arranged in a vertically spaced relationship under the reading head 34 so that the three reading heads lie in a plane, containing the Z axis, of a longitudinal section through the reference standard 24 in the corners of a right triangle. With respect thereto, the distance sensor 40 is provided in a defined position on the support body 22, that is, as close as possible to the first reading head 34. The support member 22 is U-shaped in cross-section (that is, in a direction transverse to the Z axis), carrying on its two U legs 22', 22" the first and the third reading head 34 and 38, respectively. In this arrangement the U leg 22' is extended vertically downwardly so that the second reading head 36 is sufficiently spaced from the first reading head 34 for an accurate measurement. The reading heads 34, 36, 38 are incremental optical reading heads. The distance sensor 40 is preferably a capacitive sensor, but it will be understood that an inductive or optical sensor may also be contemplated. The two-dimensional line gratings 29, 31 are cross-ruled grating structures. The reference standard 24 is preferably a glass body (Zerodur®), but could also be a body made of Invar® steel, which, while being temperature-invariant, is not equally well suited, like glass, to the application of cross-ruled grating structures.

In the embodiment illustrated in FIG. 1 the support member 22 is fastened to the front side of the carriage 14 and is preferably also made of a temperature-invariant material. Instead, the support member 22 could also be an integral part of the carriage 14.

The device 10 illustrated in FIG. 1 operates as follows:

The support member with the reading heads 34, 36, 38 and the distance sensor 40 is moved with the carriage 14 along the reference standard 24 without contacting the latter. The reading heads 34 and 38 detect their position in the Z and Y direction relative to the opposite line gratings 29 and 31, respectively, of the reference standard 24. The reading head 36 detects only its position in Y direction relative to the line grating 29 applied to the right-hand side of the reference standard 24. The distance sensor 40 senses its distance in X direction to the lateral surface 28 on the right-hand side of the reference standard 24. Owing to the arrangement of the three reading heads 34, 36, 38 and the distance sensor 40 on the support member 22 at accurately defined locations with respect to the reading heads, the location and the spatial position of the support member 22 and the carriage 14 connected therewith relative to the reference standard 24 can be determined, that is, the total of six translational and rotary components X, Y and Z and A, B and C, respectively, of the movement of the support member 22 and hence of the carriage 14.

Figure 2:
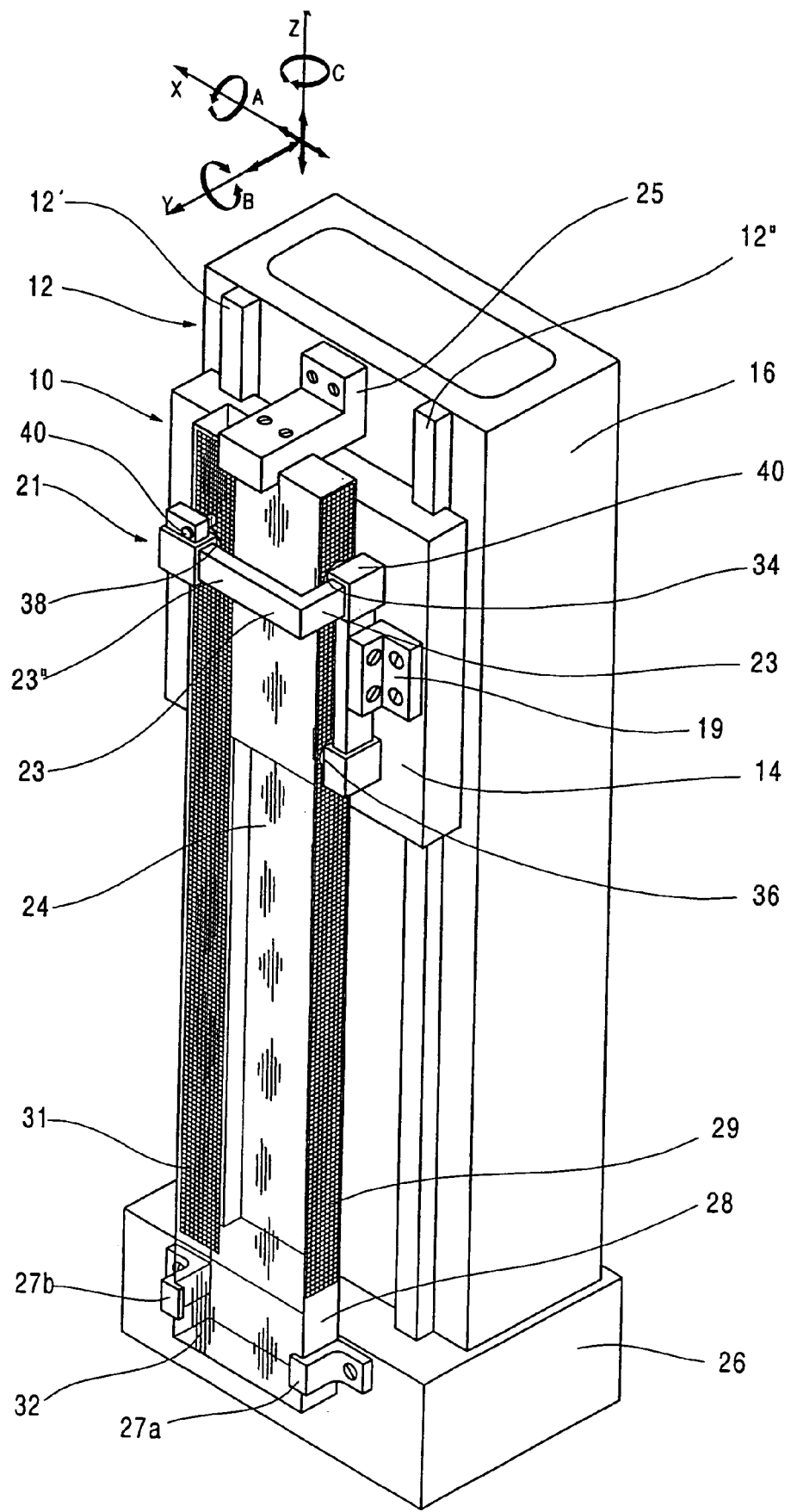
FIG. 2 is a view of a second embodiment of the device of the present invention, whose position measuring system includes a reference standard carrying two-dimensional line gratings on two surfaces arranged at an angle to one another.

FIG. 2 shows a second embodiment of the device, generally designated as 10, with an alternative position measuring system 21. In this embodiment the first and the second surface on which the reference standard 24 carries the two-dimensional line gratings 29 and 31, respectively, are the lateral surface 28 and, respectively, an end surface 32 extending at an angle thereto. The third reading head 38 is associated with the line grating 31 of the end surface 32. Provided on a support member 23 adjacent to the third reading head 38 is the distance sensor 40, with the support member being an angle bracket carrying on its two angle arms 23', 23" the first and the second reading head 34, 36 and, respectively, the third reading head 38. Apart from the afore-described difference in construction of the position measuring system 21 to that of the position measuring system 20, the device 10 associated with the position measuring system 21 has the same construction and the same mode of operation as the device 10 of FIG. 1 and, therefore, does not need to be described again.

What is claimed is:

1. A device for detecting a spatial position of a carriage, said device comprising:

a prismatic reference standard having line gratings at least on one first and on one second surface thereof, at least one of said line gratings being a two-dimensional line grating, wherein the carriage is movable in a coordinate axis along a guide with respect to the standard, said standard extending parallel to the guide, and a position measuring system for determining a spatial position of a support member fixedly connectible with or integrated into the carriage, said position measuring system comprising:

a first reading head and, spaced therefrom, a second reading head, which are provided on the support member and associated with a first one of the line gratings;
a third reading head provided on the support member and associated with a second one of the line gratings; and
a distance sensor for detecting the distance between the support member and one of the surfaces provided with a line grating or any surface parallel thereto; and
wherein the support member is arranged on the carriage in such manner that the support member is prevented from contacting the reference standard during the detection operation.

2. The device as claimed in claim 1, wherein the first and the second surfaces are two opposed, parallel lateral surfaces of the reference standard.

3. The device as claimed in claim 2, wherein the support member is U-shaped in cross-section and has first and second U legs, wherein the first and second reading heads are carried on the first U leg and the third reading head is carried on the second U leg.

4. The device as claimed in claim 1, wherein the first and the second surfaces of the reference standard are, respectively, one lateral surface and one end surface arranged at an angle thereto.

5. The device as claimed in claim 4, wherein the support member is an angle bracket having first and second angle arms, wherein the first and second reading heads are carried on the first angle arm and the third reading head is carried on the second angle arm.

6. The device as claimed in claim 1, wherein the distance sensor is provided on the support member in a defined position with respect to the reading heads.

7. The device as claimed in claim 1, wherein the reference standard is made of a temperature-invariant material.

8. The device as claimed in claim 1, wherein the support member is made of a temperature-invariant material.

9. The device as claimed in claim 1, wherein the reference standard is configured for arrangement between two spaced longitudinal guideways forming the guide for the carriage.

10. The device as claimed in claim 1, wherein the reference standard is an elongate rectangular plate.

11. The device as claimed in claim 1, wherein the third reading head is provided on the support member in such manner that it lies opposite and level with the first or the second reading head with respect to the longitudinal dimension of the reference standard.

* * * * *